US006513774B2

United States Patent
Hailson

(10) Patent No.: US 6,513,774 B2
(45) Date of Patent: Feb. 4, 2003

(54) ADJUSTABLE MOUNTING APPARATUS

(76) Inventor: Michael J. Hailson, 60 Columbia Rd., Lowell, MA (US) 01854

(*) Notice: Subject to any disclaimer, the term of this patent is extended or adjusted under 35 U.S.C. 154(b) by 0 days.

(21) Appl. No.: 09/808,416

(22) Filed: Mar. 14, 2001

(65) Prior Publication Data

US 2001/0023915 A1 Sep. 27, 2001

Related U.S. Application Data

(60) Provisional application No. 60/192,282, filed on Mar. 27, 2000.

(51) Int. Cl.⁷ ............................. A47F 5/00; F16M 11/04; F16M 11/14
(52) U.S. Cl. ............................. 248/288.51; 248/178.1; 248/181.1; 248/181.2
(58) Field of Search .................... 248/178.1, 181.1, 248/181.2, 288.31, 288.51

(56) References Cited

U.S. PATENT DOCUMENTS

| | | |
|---|---|---|
| 357,299 A | 2/1887 | Wright |
| 590,636 A | 9/1897 | Walter |
| 687,183 A | 11/1901 | Kolander |
| 1,728,931 A | 9/1929 | Griffey |
| 1,764,721 A | 6/1930 | Hayden |
| 2,560,884 A | 7/1951 | Nagourney |
| 2,700,523 A | 1/1955 | Pollard ........................ 248/181 |
| 3,652,152 A * | 3/1972 | Thursby, Jr. ................. 350/252 |
| 3,737,130 A * | 6/1973 | Shiraishi ..................... 248/181 |
| 4,016,583 A | 4/1977 | Yeates ........................ 354/293 |
| 4,360,859 A | 11/1982 | Ziaylek, Jr. ................. 362/80 |
| 4,515,336 A | 5/1985 | Fischer ....................... 248/288.3 |
| 4,645,155 A | 2/1987 | Eldon et al. ................. 248/278 |
| 4,700,919 A | 10/1987 | Saunders, IV ............... 248/288.5 |
| 4,915,333 A | 4/1990 | Bolondi ....................... 248/181 |
| 5,016,850 A | 5/1991 | Plahn .......................... 248/206.3 |
| 5,090,654 A | 2/1992 | Ridings et al. .............. 248/343 |
| 5,098,432 A | 3/1992 | Wagenknecht ............... 606/54 |
| 5,118,058 A | 6/1992 | Richter ........................ 248/183 |
| 5,128,841 A | 7/1992 | Maglica et al. .............. 362/72 |
| RE34,120 E * | 11/1992 | Plahn .......................... 248/206.3 |
| 5,251,859 A | 10/1993 | Cyrell et al. ................. 248/288.3 |
| 5,271,651 A | 12/1993 | Blatt et al. .................... 294/88 |
| 5,280,871 A | 1/1994 | Chuang ........................ 248/516 |
| 5,320,444 A | 6/1994 | Bookwalter et al. ......... 403/323 |
| 5,419,522 A | 5/1995 | Luecke et al. ............... 248/288.5 |
| 5,441,225 A | 8/1995 | Hall ............................. 248/231.6 |
| 5,443,464 A | 8/1995 | Russell et al. ................ 606/54 |
| 5,465,946 A | 11/1995 | Smith .......................... 269/75 |
| 5,492,301 A | 2/1996 | Hauser ........................ 248/516 |
| 5,505,415 A | 4/1996 | Brett ........................... 248/168 |
| 5,513,784 A | 5/1996 | Pretorius ..................... 224/151 |
| 5,544,968 A | 8/1996 | Goellner ...................... 403/31 |
| 5,564,664 A | 10/1996 | Oschwald ................... 248/288.51 |
| 5,615,857 A | 4/1997 | Hook ........................... 248/549 |
| 5,641,191 A | 6/1997 | Jia ............................... 276/97.6 |

(List continued on next page.)

OTHER PUBLICATIONS

Newark Catalog, p. 1648, at least by Apr. 2000.
McMaster–Carr Catalog, pp. 2216 and 2217, at least by Apr. 2000.

*Primary Examiner*—Anita King
*Assistant Examiner*—Amy J. Sterling
(74) *Attorney, Agent, or Firm*—Hamilton, Brook, Smith & Reynolds, P.C.

(57) ABSTRACT

An adjustable mounting apparatus includes a mounting post having a ball at one end. Opposed clamping members clamp the ball from opposite sides of the mounting post. The clamping members engage the ball with line contact. The clamping members are at a fixed distance apart from each other on a first side of the ball. An adjustable locking member secures the clamping members together on a second side of the ball for loosening and tightening the clamping members about the ball. This allows the clamping members to be rotated about the ball and tightened thereon. A mounting fixture is secured to the clamping members to allow devices to be mounted thereon.

22 Claims, 4 Drawing Sheets

U.S. PATENT DOCUMENTS

| | | | |
|---|---|---|---|
| 5,645,253 A | 7/1997 | Hishino | 248/181.1 |
| 5,660,363 A | 8/1997 | Maglica | 248/288.31 |
| 5,660,366 A | 8/1997 | Palmer | 248/516 |
| 5,681,018 A | 10/1997 | Hoftman | 248/125.8 |
| 5,683,064 A | 11/1997 | Copeland et al. | 248/278.1 |
| 5,704,578 A | 1/1998 | Fischer | 248/288.51 |
| 5,782,572 A | 7/1998 | Thiem | 403/90 |
| 5,790,910 A | 8/1998 | Haskin | 396/427 |
| 5,803,642 A | 9/1998 | Sassmannshausen | 403/90 |
| 5,806,821 A | 9/1998 | Phillips et al. | 248/288.51 |
| 5,833,191 A | 11/1998 | Gennep | 248/288.51 |
| 5,845,885 A | 12/1998 | Carnevali | 248/118.1 |
| 5,860,728 A | 1/1999 | Maglica | 362/191 |
| 5,871,186 A | 2/1999 | Bothe et al. | 248/181.1 |
| 5,899,425 A | 5/1999 | Corey, Jr. et al. | 248/276.1 |
| 5,918,844 A | 7/1999 | Ognier | 248/276.1 |
| 5,921,694 A | 7/1999 | Herbermann | 403/56 |
| 5,927,815 A | 7/1999 | Nakamura et al. | 297/411.38 |
| 5,937,881 A | 8/1999 | Villa | 135/20.1 |
| 5,979,724 A | 11/1999 | Loewenthal, Jr. et al. | 224/483 |
| 6,017,010 A | 1/2000 | Cui | 248/288.31 |
| 6,254,044 B1 * | 7/2001 | Lee | 248/177.1 |

\* cited by examiner

ADJUSTABLE MOUNTING APPARATUS

RELATED APPLICATION(S)

This application claims the benefit of U.S. Provisional Application No. 60/192,282, filed on Mar. 27, 2000. The entire teachings of the above application are incorporated herein by reference.

BACKGROUND

Adjustable mounting apparatuses are often employed for positioning instruments such as sensors or cameras in industrial applications. Such mounting apparatuses typically consist of a bracket having a pivoting or swiveling joint which can be locked to orient the instrument in a desired position. One common joint is a ball and socket joint where a ball extending from an end of a post is contained within a socket and is capable of swiveling therein. Typically, the socket encloses a large portion of the ball and is clamped against the ball to lock the joint in a desired fixed position.

SUMMARY

A drawback of such a ball and socket joint is that the surfaces of the ball and socket, which are clamped together, contact each other over a large surface area. In industrial applications, dirt, grease and other contaminants tend to accumulate between the contacting surfaces of the ball and socket which often prevents the joint from locking properly.

The present invention provides an adjustable mounting apparatus in which the ability of the joint to lock is not affected by contaminants. The present inventive adjustable mounting apparatus includes a mounting post having a ball at one end. Opposed clamping members clamp the ball from opposite sides of the mounting post. The clamping members engage the ball with line contact. The clamping members are at a fixed distance apart from each other on a first side of the ball. An adjustable locking member secures the clamping members together on a second side of the ball for loosening and tightening the clamping members about the ball. This allows the clamping members to be rotated about the ball and tightened thereon. A mounting fixture is secured to the clamping members to allow devices to be mounted thereon.

In preferred embodiments, the clamping members are rigidly secured to each other on the first side of the ball. Each clamping member may consist of a plate with a hole formed therethrough. Edges of the hole form clamping edges which engage the ball with line contact. Typically, the hole is circular with each clamping member having a circular outer perimeter such that each clamping member is annular in shape. The adjustable locking member is hand operated and a base secures the mounting post to a surface. The mounting post has a stem extending from the ball along a first axis. The stem has a width that is less than the distance between the clamping members and has a sufficient axial length so that the clamping members are capable of being rotated around the ball 360° about the first axis and approximately 90° about a second axis that is transverse to the first axis.

In the present invention mounting apparatus, the design of the clamping members provides a lockable joint with increased range of motion over prior designs. In addition, the clamping edges of the clamping members exert a clamping force on the ball along lines of contact which typically do not become affected by contaminants covering the ball. The thin lines of contact of the clamping edges are able to penetrate through contaminants. Consequently, the present invention apparatus is suitable for use in corrosive, contaminated or dirty environments.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
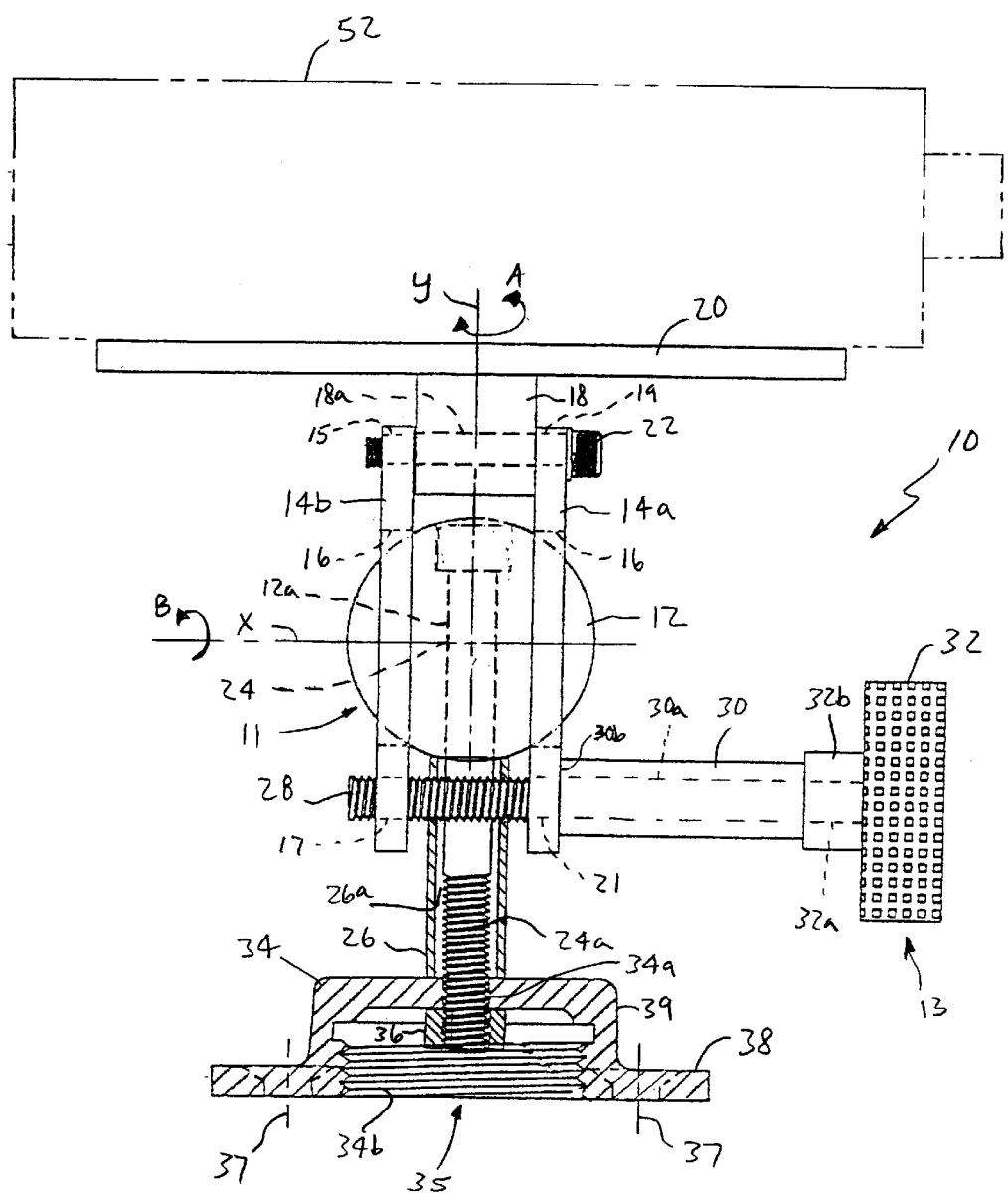
FIG. 1 is an end view of an embodiment of the adjustable mounting apparatus of the present in with portions of the base and post being in section.
Figure 2:
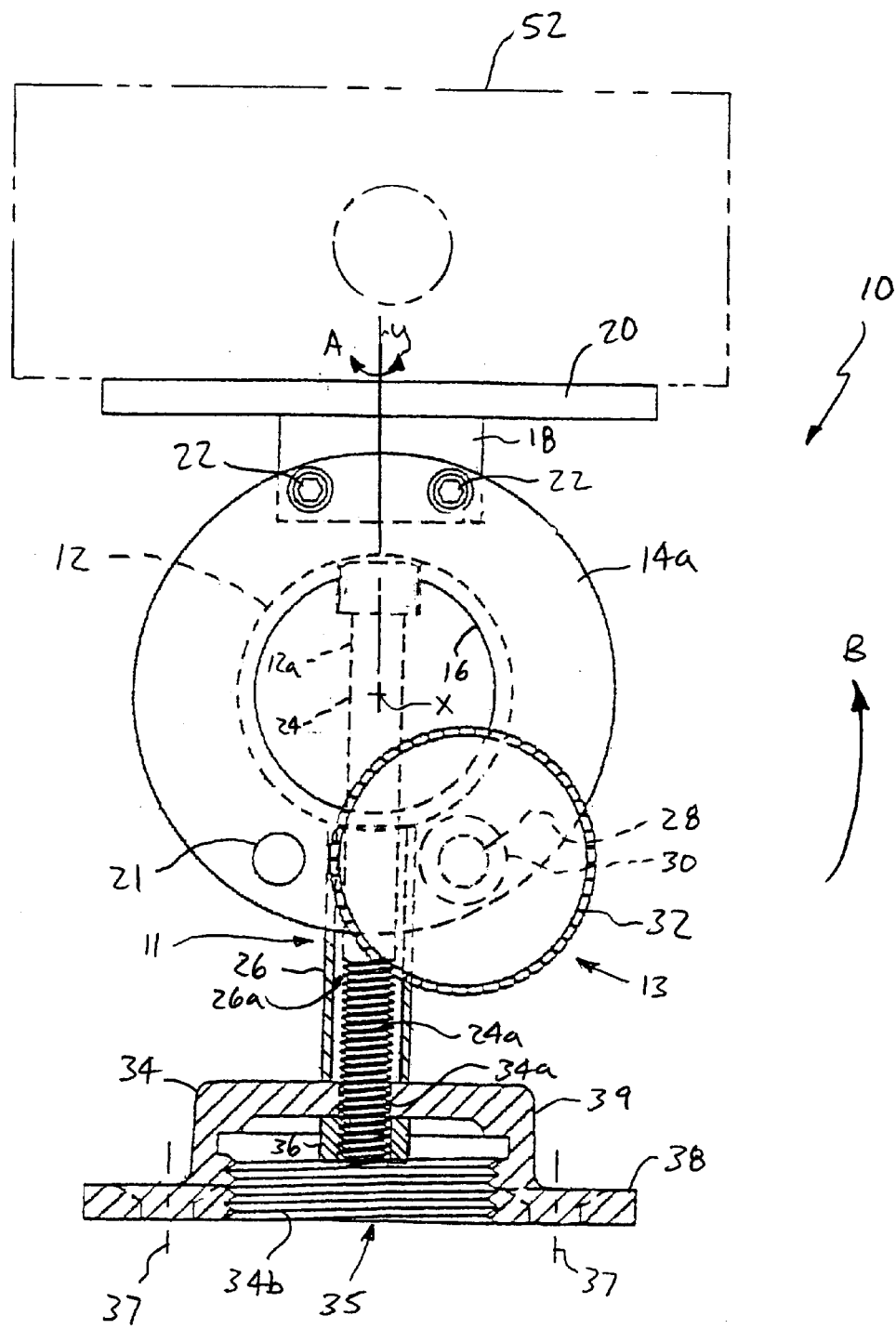
FIG. 2 is a side view of the adjustable mounting apparatus of FIG. 1 with portions of the base and post being in section.
Figure 3:
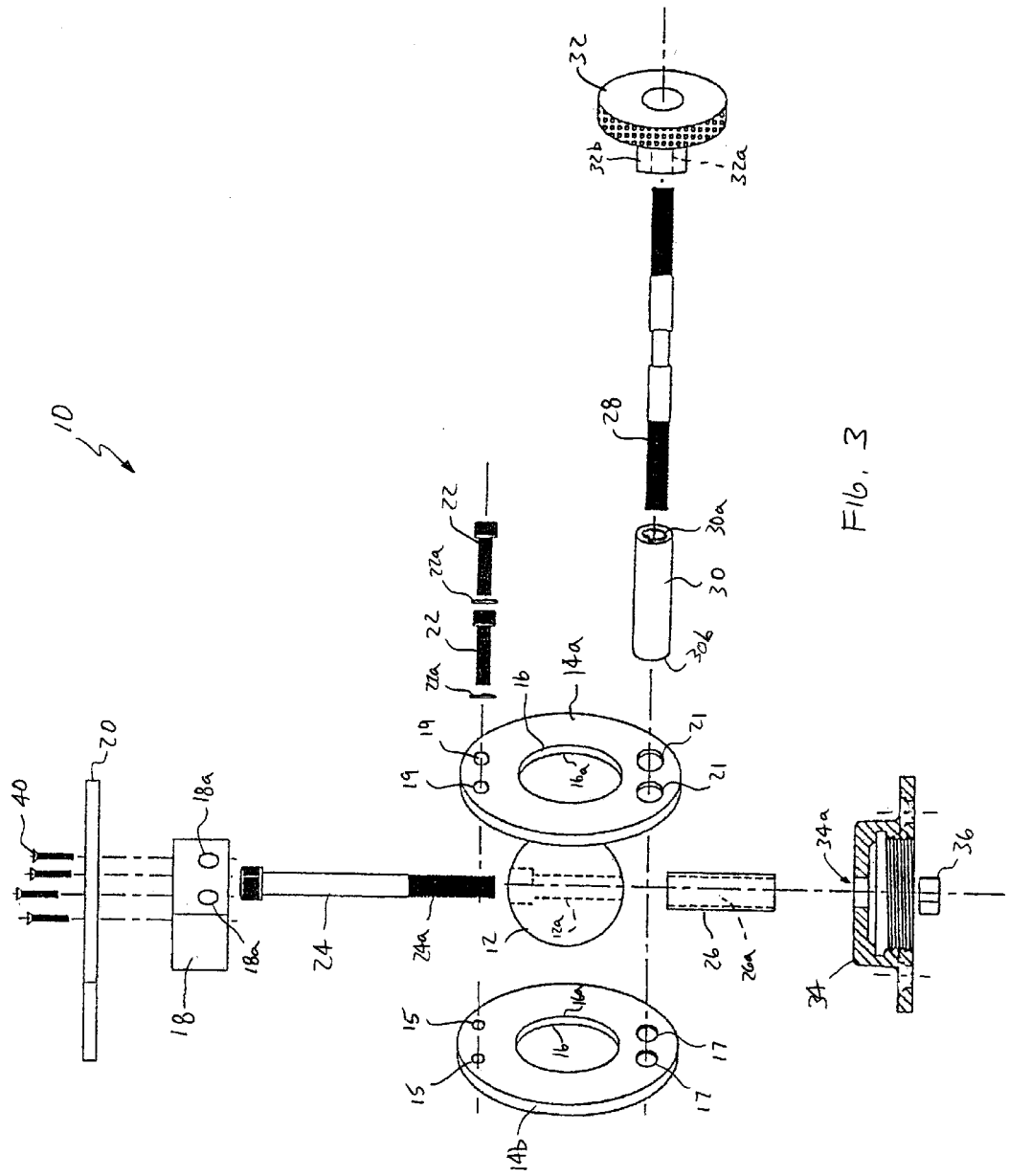
FIG. 3 is an exploded view of the adjustable mounting apparatus of FIG. 1.

Referring to FIGS. 1–3, adjustable mounting apparatus 10 allows an instrument 52, for example, a camera (shown in phantom) or a sensor, to be mounted thereon and positioned at a desired fixed orientation. Mounting apparatus 10 includes a mounting post 11 (FIG. 1) having a ball 12 and a stem 26 extending therefrom. The ball 12 is releasably clamped by opposed annular clamping members 14a/14b (FIGS. 2 and 3) which are loosened and tightened about the ball 12 by a hand operated adjustable locking member 13. This enables instrument 52 to be moved into the desired orientation by pivoting or swiveling clamping members 14a/14b about ball 12 when loosened. A mounting fixture 20 is coupled to the clamping members 14a/14b to allow instrument 52 to be mounted thereto. The stem 26 of mounting post 11 is coupled to a base 34 which allows apparatus 10 to be mounted to a secure surface or structure.

In use, the position of instrument 52 is moved into the desired orientation by first loosening the clamping members 14a/14b with locking member 13. Once loosened, the opposed annular clamping members 14a/14b are able to rotate 360° around ball 12 in the direction of arrow "A" about axis Y (FIG. 1). In addition, clamping members 14a/14b are able to rotate approximately 90° about axis X in the direction of arrow "B" (FIGS. 1 and 2). Since the instrument 52 is mounted to clamping members 14a/14b by mounting fixture 20, instrument 52 moves in a corresponding manner. Once instrument 52 is moved into the desired position, locking member 13 tightens clamping members 14a/14b to lock the clamping members in place about ball 12, thereby fixing the position of instrument 52.

A more detailed description of one embodiment of mounting apparatus 10 now follows. Ball 12 is typically a hardened steel spherical ball 12 having a counterbored hole 12a extending therethrough and stem 26 is formed from a hollow tube. Ball 12, stem 26 and base 34 are secured together by a screw 24 extending through the hole 12a of ball 12, the interior 26a of stem 26 and the hole 34a within the hub 39 of base 34. The tip of screw 24 extends into the inner cavity 35 of base 34 where a nut 36 is tightened over the threads 24a of screw 24. Although ball 12, stem 26 and base 34 are shown to be separate components (FIG. 3), alternatively, the ball 12 and the stem 26 may be a single component. Such a single component could also include base 34.

The inner cavity 35 of base 34 typically includes an internal thread 34b (FIGS. 1 and 2) thereby allowing base 34 to be secured to the threaded end of a pipe or a rod. In addition, base 34 includes a flange 38 extending from hub 39 having a series of mounting holes 37 for mounting base 34 to a flat surface with screws. Hub 39 may be round and flange 38 rectangular or square. Alternatively, hub 39 may be rectangular and flange 38 round. Also, hub 39 and flange 38 may be both round or both rectangular/square or any other suitable shape.

Clamping members 14a/14b are typically annular rings formed from plate material which clamp ball 12 from opposite sides of stem 26 (FIGS. 1 and 3). Clamping members 14a/14b are rigidly coupled together a fixed distance apart from each other on one side of ball 12 by a rigid spacer block 18. Two screws 22 extend through clearance holes 19 in clamping member 14a, through clearance holes 18a in spacer block 18, and into threaded holes 15 within clamping member 14b for coupling clamping members 14a/14b and spacer block 18 together. Alternatively, clamping members 14a/14b and spacer block 18 may be formed as a single component. Clamping members 14a/14b include a pair of holes 21/17 which are located on clamping members 14a/14b at the opposite side of ball 12 from spacer block 18. The holes 21/17 allow the adjustable locking member 13 to adjustably couple the clamping members 14a/14b together on the side of ball 12 opposite from spacer block 18 on either side of stem 26 (FIGS. 1 and 2). As a result, clamping members 14a/14b are connected together at two points that are approximately on opposite sides of ball 12.

Adjustable locking member 13 consists of a threaded rod 28 secured in a hole 32a within hub 32b of knob 32 (FIG. 3). The threaded rod 28 passes through the interior 30a of a tubular spacer 30 and one of the clearance holes 21 within clamping member 14a before engaging the corresponding threaded hole 17 within clamping member 14b. Since the threaded rod 28 can pivot to only one side of stem 26 as can be seen in FIG. 2, adjustable locking member 13 can be positioned in either set of holes 21/17 depending on the direction of pivoting about axis X that is desired. Consequently, by repositioning adjustable locking member 13, instrument 52 has a total pivoting range of approximately 180° (90°+90°) about axis X. When adjustable locking member 13 is tightened, the end or shoulder 30b of spacer 30 (FIG. 3) is tightened against the face of clamping member 14a bringing the clamping members 14a/14b closer together which locks clamping members 14a/14b to ball 12. Since the clamping members 14a/14b are secured to each other a fixed distance by spacer block 18, the locking member 13 may cause the clamping members 14a/14b to somewhat pivot about the bottom edge of spacer block 18 when being tightened toward each other. In addition, the clamping members 14a/14b may deflect to some degree. When clamping members 14a/14b are tightened about ball 12, the clamping members 14a/14b are closer together on the side of ball 12 where locking member 13 is located than on the side of ball 12 where spacer block 18 is located. The clamping members 14a/14b may slightly angle toward each other.

The hole 16 within each clamping member 14a/14b forms an inner right angled clamping edge 16a (FIG. 3) which engages the ball 12 with annular line contact. As a result, the clamping edge 16a engages ball 12 with minimal surface to surface contact. The clamping force of clamping members 14a/14b is therefore exerted over a very small or narrow surface area so that clamping edges 16a can grip ball 12 with extremely high pressure. Hole 16 has a diameter that is slightly smaller than the diameter of ball 12, with a hole diameter of about 80% the ball diameter being typical. This spaces the clamping edges 16a of clamping members 14a/14b away from the center of ball 12 and provides annular lines of contact with sufficient circumference for maximized locking strength. The line contact between clamping edges 16a of clamping members 14a/14b and ball is not affected by dirt, grease, corrosion or other contaminants on ball 12 or clamping members 14a/14b. When clamping members 14a/14b are locked in place, the high pressure exerted by clamping edges 16a on ball 12 along thin annular lines of contact penetrates almost all the contaminants on ball 12 for a secure grip. The right angled shape of clamping edges 16a when tightened against the surface of ball 12 may penetrate the contaminants in a manner similar to a knife edge on a cutting board. Although a circular hole 16 may provide an annular line of contact with ball 12, hole 16 may be shaped to provide intermittent lines of contact. Such hole shapes may be, for example, triangular, square, polygonal, generally circular with recessed cutouts or portions with a different radius of curvature, etc.

The distance between clamping members 14a/14b (FIG. 1) is greater than the width or diameter of stem 26 and, in one embodiment, allows the clamping members 14a/14b to tilt about 10° to either side of axis Y before a clamping member 14a/14b hits stem 26. The space between clamping members 14a/14b also permits clamping members 14a/14b to rotate about axis X of ball 12 with stem 26 being located therebetween. The circular outer diameter of clamping members 14a/14b is shaped and sized not to interfere with base 34, so that the rotation of clamping members 14a/14b about axis X is typically limited only by the threaded rod 28 of locking member 13 and the components secured to the upper portion of clamping members 14a/14b, such as spacer block 18, mounting fixture 20 and instrument 52. As previously mentioned, this is usually 90°. In addition, stem 26 is sized to have a sufficient length for minimum interference. There are no limitations on the rotation of clamping members 14a/14b around ball 12 about axis Y so that rotation of 360° is possible.

Depending upon the instrument 52 to be mounted, a mounting fixture 20 may be coupled to spacer block 18 by screws 40. Mounting fixture 20 is typically a flat plate with mounting holes. The size and hole configuration of mounting fixture 20 can be varied depending upon the size and mounting type of instrument 52. Alternatively, spacer block 18 may serve as a mounting fixture with instrument 52 being secured thereto. In either case, mounting fixture 20 or spacer block 18 may have holes formed therein or threaded posts extending therefrom for mounting instrument 52 thereto. Furthermore, it is also possible to mount an instrument 52 directly to clamping members 14a/14b. In such a case, fasteners such as screws would serve as a mounting fixture.

In one embodiment, ball 12 is about 1½ inches in diameter with clamping rings 14/a/14b being about 2¼ inches in diameter, ¼ inch thick and holes 16 being 1.219 inches in diameter. Spacer block 18 is 0.875 inches wide, 1 ½ inches long and ⅝ inches high. This spaces clamping members 14a/14b 0.875 inches apart from each other. Stem 26 and tubular spacer 30 are 1 inch long, 0.53 inches in diameter, and have a 0.30 inch diameter opening therethrough. Base 34, spacer block 18 and mounting fixture 20 are typically made of aluminum. Clamping members 14a/14b, ball 12, stem 26 and tubular spacer 30 are typically stainless steel while knob 32 is typically plastic. Such materials are used for corrosive environments and may be varied depending upon the application at hand. Although specific dimensions have been given above, it is understood that mounting apparatus 10 comes in a variety of sizes to meet the particular capabilities or needs required and, therefore, all the dimensions are variable. For example, a mounting apparatus 10 can be made that is 3½ inches high to hold up to 10 pounds; a mounting apparatus 10 can be made that is 4¼ inches high to hold up to 20 pounds; and a mounting apparatus 10 can be made that is 5¾ inches high to hold up to 35 pounds.

Figure 4:
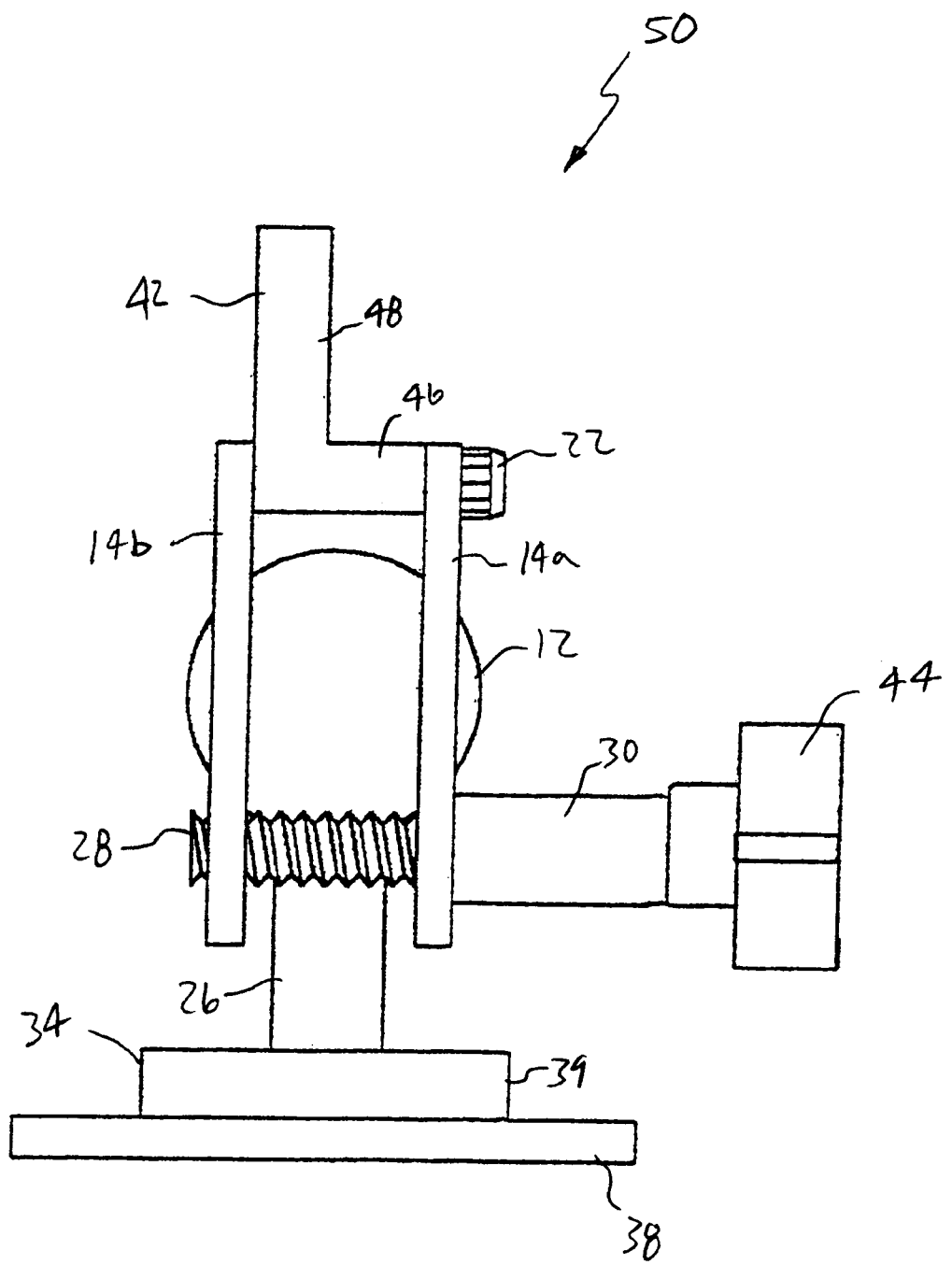
FIG. 4 is an end view of another embodiment of the present invention adjustable mounting apparatus.

Referring to FIG. 4, adjustable mounting apparatus 50 is an other embodiment of the present invention. Mounting apparatus 50 differs from mounting apparatus 10 in that mounting fixture 42 has horizontal leg 46 and a vertical leg 48 extending from one side of horizontal leg 46. The horizontal leg 46 serves as the spacer block and, consequently, spacer block 18 is omitted. Vertical leg 48 allows side mounting of instruments. Mounting apparatus 50 also has a knob 44 with cross shaped protrusions.

While this invention has been particularly shown and described with references to preferred embodiments thereof, it will be understood by those skilled in the art that various changes in form and details may be made therein without departing from the scope of the invention encompassed by the appended claims.

For example, although mounting apparatuses 10 and 50 are typically used for industrial applications, mounting apparatuses 10 and 50 are also suitable for outdoor uses, such as marine applications. In addition, although instruments are often mounted on mounting apparatuses 10 and 50, other articles may be mounted thereon such as flag poles, antennas, fishing rods, etc. Furthermore, although locking member 13 has been described as having a threaded screw that is tightened by rotation, alternatively, other suitable locking members may be employed such as latching devices. Also, although locking member 13 has been described to be hand operated, locking member 13 may be designed to be loosened and tightened with tools, such as a screw driver or wrench. Although the clamping edges 16a are typically formed by a circular hole 16, alternatively, the clamping edges 16a may be formed by the edges of a raised ridge instead of a hole. Hole 16 can also have a raised ridge forming clamping edges 16a.

What is claimed is:

1. An adjustable mounting apparatus comprising:
   a mounting post, the mounting post including a stem portion and a ball at one end thereof;
   opposed clamping members for clamping the ball from opposite sides of the stem portion of the mounting post, the clamping members engaging the ball with line contact, the clamping members being a fixed distance apart from each other on a first side of the ball;
   an adjustable locking member for securing the clamping members together on a second side of the ball for loosening and tightening the clamping members about the ball, thereby allowing the clamping members to be rotated about the ball and tightened thereon; and
   a mounting fixture secured to the clamping members.

2. The apparatus of claim 1 in which the clamping members are rigidly secured to each other on said first side of the ball.

3. The apparatus of claim 2 in which the adjustable locking member is hand operated.

4. The apparatus of claim 1 further comprising a base for securing the mounting post to a surface.

5. The apparatus of claim 4 in which the mounting fixture allows a device to be mounted thereon.

6. The apparatus of claim 1 in which each clamping member comprises a plate with a hole formed therethrough, edges of the hole forming clamping edges which engage the ball with line contact.

7. The apparatus of claim 6 in which the hole is circular.

8. The apparatus of claim 7 in which each clamping member has a circular outer perimeter such that each clamping member is annular in shape.

9. The apparatus of claim 8 in which the mounting post has a stem extending from the ball along a first axis, the stem having a width that is less than the distance between the clamping members and a sufficient axial length so that the clamping members are capable of being rotated around the ball 360° about said first axis and approximately 90° about a second axis that is transverse to said first axis.

10. An adjustable mounting apparatus comprising:
    a mounting post, the mounting post including a stem portion and a ball at one end thereof;
    opposed clamping members for clamping the ball from opposite sides of the stem portion of the mounting post, the clamping members each comprising an annular plate with a circular hole formed therethrough, edges of the hole forming clamping edges which engage the ball with line contact, the clamping members being rigidly secured a fixed distance apart from each other on a first side of the ball;
    an adjustable hand operated locking member for securing the clamping members together on a second side of the ball for loosening and tightening the clamping members about the ball, thereby allowing the clamping members to be rotated about the ball and tightened thereon; and
    a mounting fixture secured to the clamping members.

11. The apparatus of claim 10 further comprising a base for securing the mounting post to a surface.

12. The apparatus of claim 11 in which the mounting fixture allows a device to be mounted thereon.

13. The apparatus of claim 10 in which the mounting post has a stem extending from the ball along a first axis, the stem having a width that is less than the distance between the clamping members and a sufficient axial length so that the clamping members are capable of being rotated around the ball 360° about said first axis and approximately 90° about a second axis that is transverse to said first axis.

14. An adjustable mounting apparatus comprising:
    a mounting post, the mounting post including a stem portion and a ball at one end thereof;
    opposed clamping members for clamping the ball from opposite sides of the stem portion of the mounting post, the clamping members engaging the ball with line contact, the clamping members being a fixed distance apart from each other on a first side of the ball; and
    an adjustable locking member for securing the clamping members together on a second side of the ball for loosening and tightening the clamping members about the ball, thereby allowing the clamping members to be rotated about the ball and tightened thereon.

15. A method of forming an adjustable mounting apparatus comprising:
    providing a mounting post, the mounting post including a stem portion and a ball at one end thereof;
    clamping the ball from opposite sides of the stem portion of the mounting post with opposed clamping members, the clamping members engaging the ball with line contact, the clamping members being a fixed distance apart from each other on a first side of the ball;
    securing the clamping members together on a second side of the ball with an adjustable locking member for loosening and tightening the clamping members about the ball, thereby allowing the clamping members to be rotated about the ball and tightened thereon; and securing a mounting fixture to the clamping members.

16. The method of claim 15 further comprising rigidly securing the clamping members to each other on said first side of the ball.

17. The method of claim 16 further comprising making the adjustable locking member hand operated.

18. The method of claim 15 further comprising providing a base for securing the mounting post to a surface.

19. The method of claim 15 further comprising forming each clamping member from a plate with a hole formed therethrough, edges of the hole forming clamping edges which engage the ball with line contact.

20. The method of claim 19 further comprising making the hole circular.

21. The method of claim 20 further comprising forming each clamping member with a circular outer perimeter such that each clamping member is annular in shape.

22. The method of claim 21 further comprising providing the mounting post with a stem extending from the ball along a first axis, the stem having a width that is less than the distance between the clamping members and a sufficient axial length so that the clamping members are capable of being rotated around the ball 360° about said first axis and approximately 90° about a second axis that is transverse to said first axis.

* * * * *